United States Patent
Meijer et al.

(10) Patent No.: US 11,463,790 B2
(45) Date of Patent: Oct. 4, 2022

(54) ADAPTIVE PUBLISHING FOR CONTENT DISTRIBUTION

(71) Applicant: COMCAST CABLE COMMUNICATIONS MANAGEMENT, LLC, Philadelphia, PA (US)

(72) Inventors: Paul Meijer, Seattle, WA (US); Mark Hellkamp, Bothell, WA (US)

(73) Assignee: COMCAST CABLE COMMUNICATIONS MANAGEMENT, LLC, Philadelphia, PA (US)

( * ) Notice: Subject to any disclaimer, the term of this patent is extended or adjusted under 35 U.S.C. 154(b) by 0 days.

(21) Appl. No.: 16/252,290

(22) Filed: Jan. 18, 2019

(65) Prior Publication Data

US 2019/0158937 A1    May 23, 2019

Related U.S. Application Data

(63) Continuation of application No. 15/450,824, filed on Mar. 6, 2017, now abandoned, which is a continuation of application No. 13/651,052, filed on Oct. 12, 2012, now Pat. No. 9,686,597.

(51) Int. Cl.
| | | |
|---|---|---|
| G06F 15/16 | (2006.01) |
| H04N 21/858 | (2011.01) |
| H04N 21/2343 | (2011.01) |
| H04N 21/8543 | (2011.01) |
| H04L 67/306 | (2022.01) |
| H04L 67/565 | (2022.01) |

(52) U.S. Cl.
CPC ....... H04N 21/8586 (2013.01); H04L 67/306 (2013.01); H04L 67/565 (2022.05); H04N 21/23439 (2013.01); H04N 21/8543 (2013.01)

(58) Field of Classification Search
CPC ......... H04N 21/8586; H04N 21/23439; H04N 21/8543; H04L 67/306; H04L 67/2823
See application file for complete search history.

(56) References Cited

U.S. PATENT DOCUMENTS

| | | | |
|---|---|---|---|
| 9,686,597 B2 | 6/2017 | Meijer et al. | |
| 2004/0153968 A1* | 8/2004 | Ching | G06F 40/117 |
| | | | 715/235 |
| 2005/0102260 A1 | 5/2005 | Spring et al. | |
| 2008/0207182 A1 | 8/2008 | Maharajh et al. | |
| 2008/0263602 A1* | 10/2008 | Murray | G06F 16/40 |
| | | | 725/87 |
| 2010/0161575 A1 | 6/2010 | Basso et al. | |
| 2011/0252082 A1 | 10/2011 | Cobb et al. | |
| 2012/0079528 A1* | 3/2012 | Trimper | H04N 21/25891 |
| | | | 725/31 |

(Continued)

*Primary Examiner* — Padma Mundur
(74) *Attorney, Agent, or Firm* — Ballard Spahr LLP

(57) ABSTRACT

Provided are methods and systems for managing, distributing, and publishing content. An exemplary method can comprise receiving, in a content management system, an asset for distribution. The method can also comprise generating a metadata object according to a submission standard or requirement of a destination asset distribution platform. The destination asset distribution platform can be external to the content management system and the metadata object can comprise data indicative of or associated with the asset.

19 Claims, 6 Drawing Sheets

(56) References Cited

U.S. PATENT DOCUMENTS

2014/0108592 A1 4/2014 Meijer et al.
2014/0304215 A1* 10/2014 Masinter ............ G06F 16/1873
707/602
2018/0041821 A1 2/2018 Meijer et al.

* cited by examiner

ADAPTIVE PUBLISHING FOR CONTENT DISTRIBUTION

CROSS REFERENCE TO RELATED PATENT APPLICATION

This application claims priority to U.S. Non-Provisional application Ser. No. 15/450,824 filed Mar. 6, 2017, which is a continuation of U.S. Non-Provisional application Ser. No. 13/651,052 filed Oct. 12, 2012, issued as U.S. Pat. No. 9,686,597 which are both herein incorporated by reference in their entirety.

BACKGROUND

Media content generators, distributors, and publishers often have to handle large amounts of content from a variety of sources. For example, some media content generators have large libraries of content stored in high resolution format, and distribution of these large libraries of content can be difficult to manage because distribution can occur through different types of networks to consumers with varying bandwidth on the network. Additionally, consumers can access content on a network through different devices having different optimal viewing formats. Furthermore, different distribution networks support different content formats. These varying factors as well as the content itself can be susceptible to change due to media content providers, distributors, and consumers. Thus, there is need for more sophisticated methods and systems for managing the publishing and distribution of content.

SUMMARY

It is to be understood that both the following general description and the following detailed description are exemplary and explanatory only and are not restrictive, as claimed. Provided are methods and systems for content management, distribution, and publishing. In one aspect, the methods can comprise receiving, in a content management system (CMS), an asset for distribution. The methods can also comprise generating a metadata object according to a requirement of a destination asset distribution platform. The destination asset distribution platform can be external to the content management system, and the metadata object can comprise data associated with the asset.

In another aspect, the methods can comprise receiving a modification of at least one of an asset or data associated with an asset. The asset can be associated with one or more publishing profiles, and each publishing profile can comprise instructions for converting the asset to one or more distribution formats. The methods can also comprise performing an update action based on the modification. The update action can comprise conforming the asset to the modification in at least one distribution format.

In yet another aspect, the methods can comprise receiving an instruction to replace a first asset with a second asset. The methods can also comprise identifying one or more publishing profiles associated with the first asset. Each publishing profile can comprise at least one distribution format characteristic. The methods can further comprise conforming the second asset to at least one distribution format characteristic. The methods can comprise associating a uniform resource identifier (URI) with the second asset in a distribution format instead of with the first asset.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
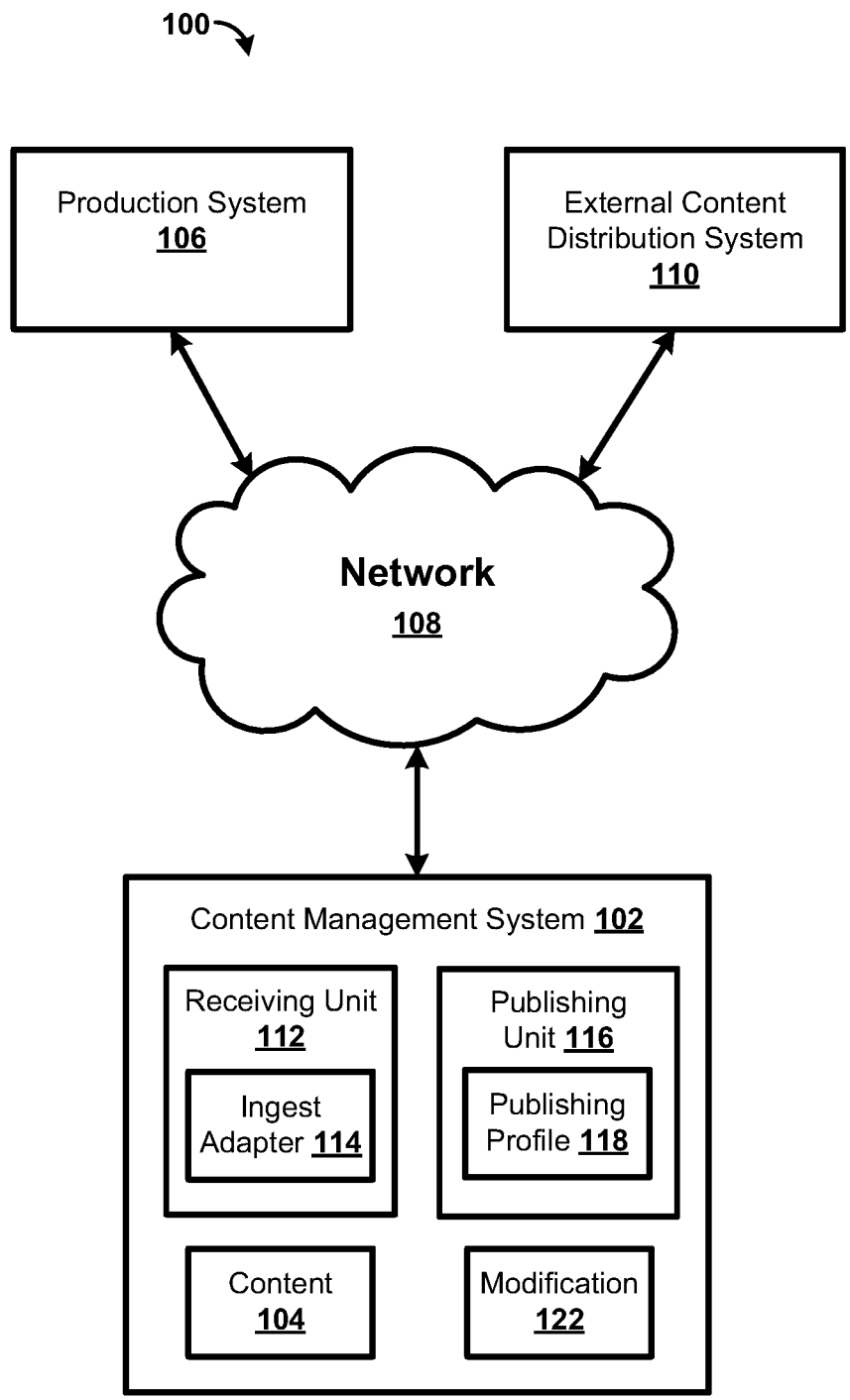
FIG. 1 is block diagram illustrating various aspects of an exemplary system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates various aspects of an exemplary system in which the present methods and systems can operate. The present disclosure relates to methods and systems for content management, distribution, and publishing. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a content management system 102. For example, the content management system 102 can be configured to receive, organize, and distribute content 104. In an aspect, the content management system 102 can be configured to communicate with a production system 106 through a network 108. The production system 106 can be configured to manage content 104 before the content is ready for distribution. For example, a production system 106 can store the content in a high resolution format. The production system 106 can be configured to edit the content and communicate the edited content to the content management system 102. In one aspect, the edited content can comprise content in a mezzanine format, such as a format having less than the original resolution of the content in the production system but greater resolution than the resolution in which the content is delivered to a consumer.

In an aspect, the content management system 102 can be configured to communicate content to an external content distribution system 110 through the network 108. The external content distribution system 110 can provide the content to consumers through a distribution network. In one aspect, the network 108 can comprise the distribution network, for example, the network 108 can be the Internet. In another aspect, the distribution network can be a separate network between the external content distribution system 110 and the consumer, such as a cable distribution network. In one aspect, the external content distribution system 110 can comprise an external content management system, for example, similar to the content management systems provided in distribution systems like Hulu, YouTube, MSN, and the like. The external content management system can have a different application programming interface (API), receiving unit, and publishing unit than the CMS 102. Additionally, the external content management system can be implemented based on different assumptions regarding how content can be stored and distributed than the CMS 102.

In an aspect, the content management system 102 can comprise a receiving unit 112 configured to receive content into the content management system 102. The receiving unit 112 can be configured to receive content from a content provider. For example, the content provider can transmit content to a designated folder on a file transfer protocol (FTP) site accessible to the content management system 102. In another aspect, the content provider can transmit the content by using the production system 106 described above or through another available user interface such as a web interface. Content can comprise one or more assets for distribution to consumers for various purposes such as entertainment and education. By way of example, content can comprise movies, television shows, advertisements, video blogs, radio shows, music, audio, video, streaming media, and the like of an asset. Content can also comprise data associated with an asset, such as metadata. In one aspect, metadata can comprise information related to the title, length, format, digital rights, distribution destination, description, aspect ratio, and the like. Metadata can be stored in file types such as an mRSS, XML, CSV, and/or similar file type.

In an aspect, the receiving unit 112 can comprise one or more ingest adapters 114 associated with one or more file types, and each ingest adapter 114 can be configured to read data according to the format of the file type associated with the adapter. For example, a Microsoft Excel ingest adapter 114 can be configured to read a spreadsheet in Excel format and translate the data from the spreadsheet into a format used by the content management system 102. The ingest adapter 114 can be based on a script provided by the content management system 102 and/or a custom script provided by a user of the content management system. In one aspect, the script can be written in Groovy, but other languages can be used such as JavaScript, PHP, Perl, Python, Ruby, and the like.

In one aspect, the metadata can comprise a publication instruction. The publication instruction can comprise one or more distribution formats, one or more distribution destinations, or other information related to publication of the content, or a combination thereof. Example distribution formats can comprise video codec specifications such as MPEG-4, MPEG-2, H.264, and the like; video container specifications such as QuickTime movie, flash video, MPEG-4, and the like; video aspect ratio specifications such as 4:3, 16:9, 5:3, and the like; video resolution specifications such as 1920×1080 pixels or 720×480 pixels; audio specifications such as MPEG-3 or AAC; size specifications such as a maximum file size; and other similar specifications relevant to providing content over distribution systems. In one aspect, the distribution format can provide specifications optimized for one or more devices such as an smart phone, tablet device, personal computer, widescreen television, game console (e.g. Xbox 360, PlayStation 3), digital media receiver (e.g. Roku, Boxee, set top box, Apple TV), and the like.

As previously mentioned, the publication instruction can also comprise one or more distribution destinations. A distribution destination can comprise, for example, one or more locations for providing content to a cable distribution network, internet media portal, or other distributor of content. A location for providing content can comprise a folder on an FTP site or other similar location. In another aspect, a location can be provided through a content feed. Thus, the receiving unit 112 can be configured to listen for updates to a feed and retrieve content based on updates to the feed.

In one aspect, the content management system 102 can comprise a publishing unit 116 configured to publish the content. Publishing the content can comprise releasing content publicly by providing a uniform resource identifier (URI). A URI can comprise one or more characters or symbols configured to identify a name and a location of the content. In one aspect, the URI can comprise a protocol type and a file path. For example, a file located on a file transfer protocol can have a URI comprising ftp://domain.com/user/filename.ext. In this example, ftp can identify a protocol or naming scheme such as file transfer protocol, domain.com can indicate the domain name pointing to the location of a server, forward slashes can indicate a directory structure, filename can indicate a name of the file, and .ext can represent the extension used by a particular file type. Similarly, a file located on a hypertext transfer protocol server can, for example, have a URI comprising http://www.domain.com/user/filename.ext. Additionally, other URI formats can be used to identify the location of content.

In another aspect, the publishing unit 116 can be configured to release the content to the external content distribution system 110. The publishing unit 116 can comprise one or more publishing profiles 118, and each publishing profile 118 can specify one or more distribution formats. Additionally, each publishing profile 118 can comprise at least one conversion algorithm for converting an asset to one or more distribution formats. The publishing profile 118 can be associated with a particular distributor and can comprise a list of all the distribution formats specified by the distributor.

In one aspect, a publishing profile 118 can be shared by a plurality of users of the content management system 102, and for each user, the publishing profile 118 can provide the specifications for a particular external content distribution system 110. The publishing unit 116 can be configured to generate the content, such as an asset, in one or more distribution formats. For example, if a user associates content with a publishing profile 118, then the publishing unit 116 can read the publishing profile 118 to determine the distribution formats related to the publishing profile 118. Then, the publishing unit 116 can generate the content in the distribution formats determined from the publishing profile 118. For example, the publishing profile 118 can specify distribution formats such as high quality, medium quality, low quality MPEG-2 files, or a combination thereof. Accordingly, the publishing unit 116 can create a copy of the content in a high quality MPEG-2 file, a copy of the content in a medium quality MPEG-2 file, and a copy of the content in a low quality MPEG-2 file. In one aspect, high quality can be 1080 pixel High Definition (HD) resolution, medium quality can be 720 pixel HD resolution, and low quality can be 420 interlaced standard definition resolution.

In one aspect, the publishing profile 118 can specify how to publish the content. For example, the publishing profile 118 can specify whether the content is to be published by releasing a public URI or by transmitting the content to an external content distribution system 110. In one aspect, the custom publishing profiles 118 can be developed for the content management system 102. The publishing profile 118 can comprise a script in a programming language such as Groovy, JavaScript, PHP, Ruby, Perl, Python, and the like. The script can be a conversion algorithm for converting the content to one or more distribution formats. In one aspect, the script is customizable. For example, the content management system 102 can provide a user interface where CMS users can create a custom publishing profile 118 by providing a custom script or modifications of an existing script. Then, CMS users can associate the publishing profile 118 with content such as one or more assets.

In one aspect, the publishing profile 118 can comprise a metadata object and/or be associated with a metadata object. For example, the publishing profile 118 can comprise one or more conversion algorithms associated with a metadata object. The metadata object can be generated by the publishing unit 116 according to a submission standard or requirement of an external content distribution system 110. For example, the metadata object can be generated based on a publishing profile 118. The metadata object can comprise data indicative of or associated with the asset such as title, description, format, size, length, and the like. For example, the metadata object can be based on metadata received by the receiving unit 112. In one aspect, the metadata object can comprise metadata formatted according to the specifications of a distribution system. The metadata object can comprise, for example, an extended markup language (XML) file, a multipurpose internet mail extensions (MIME) multipart message, or a hypertext file comprising a plurality of markup nodes. The metadata object can be transmitted to the external content distribution system 110 or otherwise made available from the content management system 102.

The publishing unit 116 can generate the content in one or more distribution formats according to the publishing profile 118. For example, a publication profile 118 can specify a video in two different aspect ratios, a thumbnail file, and a metadata file. In this case, the publishing unit 116 can generate the content (e.g., a copy of the content) in each of the two aspect ratios based on the video. After the content management system 102 receives an instruction to publish the content, the content management system 102 can release and/or transmit the two videos, the thumbnail, and the metadata file to the external content distribution system 110 or otherwise make the files available.

In one aspect, the content management system 102 can receive a modification 122 to content. The modification 122 can be received by a user manually changing a property of content or data associated with the content through a user interface to the content management system 102. In another aspect, a modification 122 can be received by receiving a modified version of the content. The content management system 102 can compare the modified content to the content already stored on the content management system 102. After determining one or more differences between the modified content and the content stored on the content management system 102, the content management system 102 can update the stored content and any publishing profiles 118 associated with the stored content. For example, if content is received with a new title, the content management system 102 can compare an existing title in the content management system 102 to the modified title. After determining the differences between the two titles, the content management system 102 can perform an update action to populate the changes in the title of the content to any copies of the content in the one or more distribution formats and to metadata associated with the content. The update action can comprise reading a publication profile 118 associated with the content to determine what changes to make to the content and/or what additional files can be generated to meet specifications in the publishing profile 118.

In one aspect, the content management system 102 can allow content to be replaced. For example, a user might decide to remove a scene from video content. Accordingly, the content management system 102 can receive the updated content and a notification to replace the original content with the new content. In one aspect, the content management system 102 can inspect the publishing profile 118 to determine if one or more copies of the content have been generated in one or more distribution formats. The content management system 102 can identify one or more uniform resource identifiers associated with the content in the one or more distribution formats. Additionally, the content management system 102 can determine if any of the copies of the content in the one or more distribution formats are currently being accessed by a consumer. Following the inspection of the publishing profile and identification of any URI's, the content management system 102 can identify and perform one or more actions to replace the content, update the publishing profiles associated with the content, and release replacement content in place of the original content.

Figure 2:
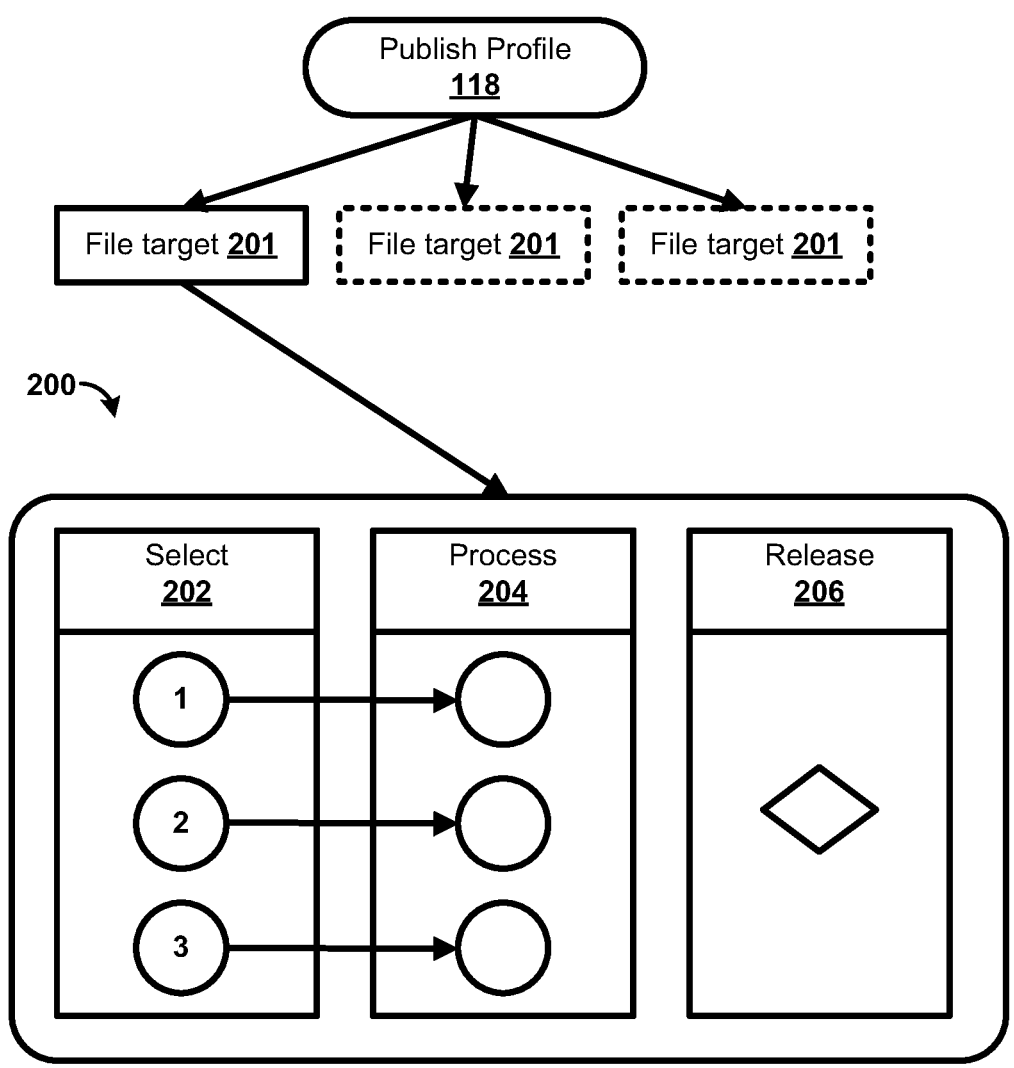
FIG. 2 is a flowchart illustrating an exemplary publishing process performed by the content management system.

FIG. 2 is a flowchart illustrating an exemplary publishing process 200 performed by the content management system. In one aspect, the publishing unit can be configured to perform the publishing process 200 based on one or more file targets 201 (e.g., distribution formats) associated with a publishing profile 118. In an aspect, the publishing process 200 can comprise one or more of a selection step 202, a processing step 204, and a releasing step 206. In the selection step 202, the one or more files can be selected based on attributes of the type such as content type, bitrate, or file format. The numbers 1, 2, and 3 shown in FIG. 2 indicate different files (e.g., an asset in a video format) analyzed by the publishing unit. For example, the publishing unit can determine whether each file meets certain criteria. If the file meets the criteria, the processing step 204 can be performed upon the file. In processing step 204, a file can be prepared for distribution by processing the file, e.g. by encoding the file to a different format, copying the file to a release server or a partner server, moving the file to a different location, and/or providing a link to the file to partner companies, and the like. In one aspect, custom logic can be provided by the content management system or by a user of the content management system. The custom logic can specify a custom distribution format and/or other custom processing steps such as creating metadata or transmitting the file and/or metadata to a specified location. The custom logic can be based on the specifications supported by one or more external content distribution systems. In releasing step 206, a file generated in a distribution format, represented by a diamond shape, can be released. By way of example, the file can be released to a public URL for end user access on the content owner portal.

Figure 3:
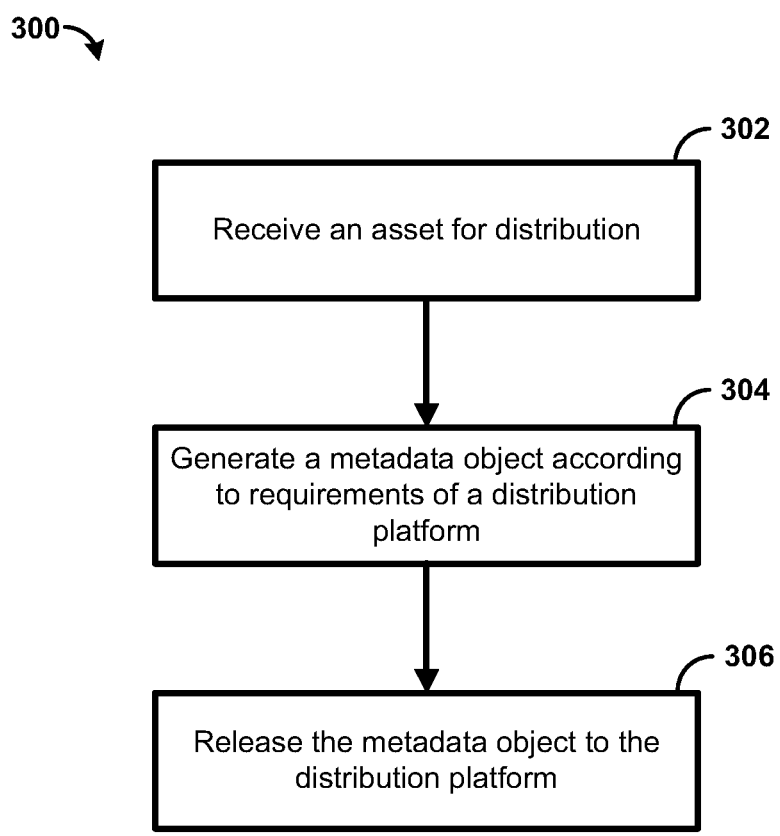
FIG. 3 is a flowchart illustrating an exemplary method of content distribution.

FIG. 3 is a flowchart illustrating an exemplary method 300 of content distribution. In step 302, an asset can be received for distribution. For example, the asset can be received in a content management system. In one aspect, the receiving action can comprise receiving streaming media, one or more video segments, and/or one or more audio segments.

In step 304, a metadata object can be generated according to requirements, such as a submission standard, of a destination distribution platform, such as an external content distribution system. The destination distribution platform can be external to the content management system, and the metadata object can comprise data indicative of the asset (e.g., data associated with metadata object of the publishing profile described in more detail above). In one aspect, the generating action of step 304 comprises generating one or more of an extended markup language (XML) file, a multipurpose internet mail extensions (MIME) multipart message, or a hypertext file comprising a plurality of markup nodes. The generating action of step 304 can also comprise executing an extended markup language (XML) generation process.

Additionally, the generating action of step 304 can comprise specifying a release method for the asset. In one aspect, the metadata object can comprise the release method, and the release method can be specific to the destination asset distribution platform. In another aspect, the generating action of step 304 can comprise specifying one or more file targets for distribution of the asset. The file targets can be distribution formats specified in a publishing profile. For example, the metadata object can comprise the one or more file targets, and the one or more file targets can be specific to the destination asset distribution platform. In step 306, the metadata object can be released (e.g., delivered or made available for access) to the destination distribution platform.

Figure 4:
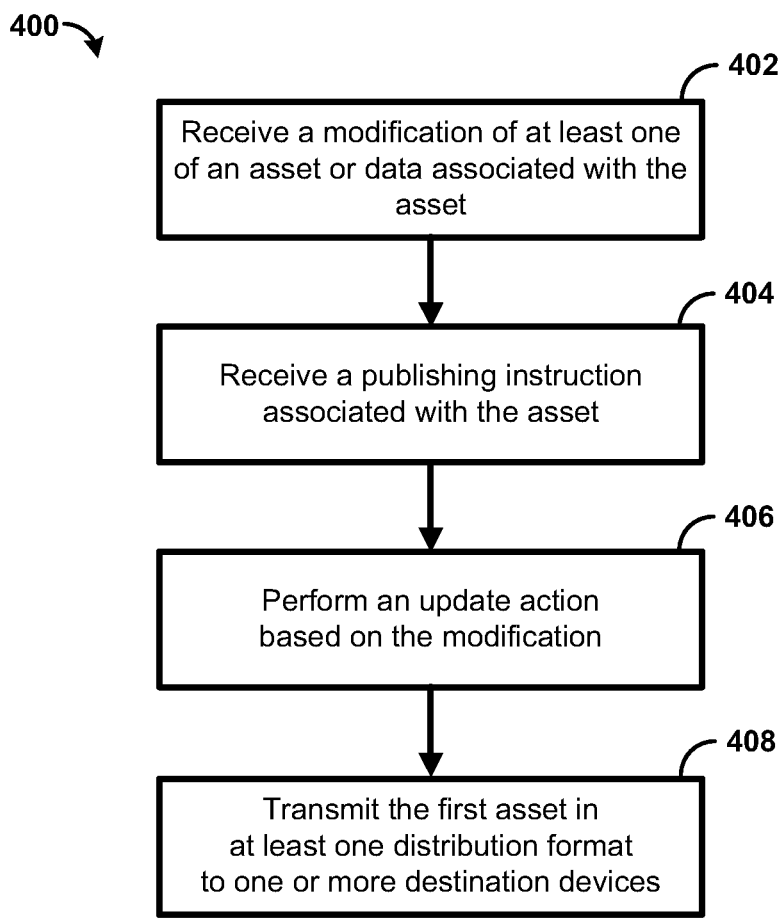
FIG. 4 is a flowchart illustrating another exemplary method of content distribution.

FIG. 4 is a flowchart illustrating another exemplary method of content distribution. In step 402, a modification of at least one of an asset or data (e.g., metadata) associated with an asset can be received. In an aspect, the asset can be associated with one or more publishing profiles, and each publishing profile can comprise instructions (e.g., a conversion algorithm) for converting the asset to one or more distribution formats. In one aspect, receiving the modification of at least one of the asset or the data associated with the asset can comprise receiving a modified version of the asset and identifying one or more differences between the asset and the modified version of the asset. In another aspect, receiving a modification of at least one of an asset or data associated with an asset can comprise receiving a modified version of the data associated with the asset and identifying one or more differences between the data associated with the asset and the modified version of the data associated with the asset.

In step 404, a publishing instruction associated with the asset can be received. In an aspect, the publishing instruction can comprise at least one of a distribution format or a distribution destination. Additionally, the one or more publishing profiles can be updated based on the publishing instruction. For example, a new distribution destination can be added and/or a publishing profile can be associated with the asset. The publishing instruction can also notify the content management system to update any copies of the asset in one more distribution formats based on the modification. In one aspect, the asset can be received to a first content management system and the distribution destination can be located within a second content management system.

In step 406, an update action can be performed based on the modification. For example, the update action can be performed based on the one or more differences between the asset and the modified version of the asset. The update action can comprise conforming the asset to the modification in at least one distribution format. The update action can comprise at least one of modifying the one or more publication profiles or generating the asset according to the modification in at least one distribution format. In one aspect, conforming the asset to the modification comprises modifying the asset generated in a distribution format of the one or more distribution formats. In another aspect, conforming the asset to the modification comprises replacing the asset generated in a distribution format of the one or more distribution formats with a modified version of the asset generated in the distribution format.

In step 408, the asset can be transmitted in at least one distribution format of the one or more distribution formats to one or more destination devices, e.g., computing devices such as servers. In one aspect, transmitting the asset in the one or more distribution formats can occur after conforming the asset to the modification in the one or more distribution formats.

Figure 5:
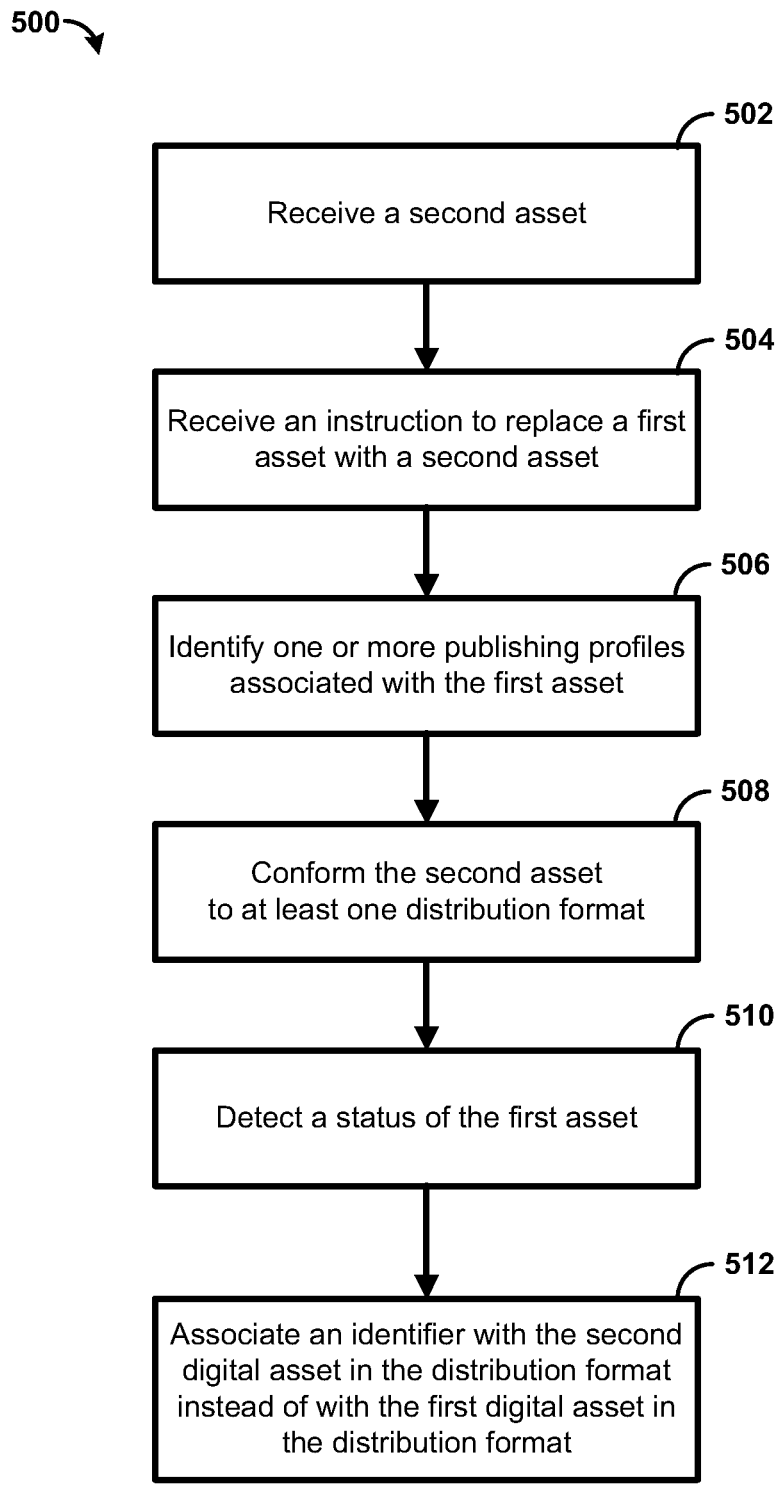
FIG. 5 is a flowchart illustrating yet another exemplary method of content distribution.

FIG. 5 is a flowchart illustrating yet another exemplary method of content distribution. In step 502, the second asset can be received into a content management system. In step 504, an instruction to replace a first asset with a second asset is received. In step 506, one or more publishing profiles associated with the first asset can be identified. In one aspect, each publishing profile can comprise at least one distribution format characteristic. In step 508, the second asset can be conformed or adapted (e.g., generated, transcoded, reconstituted, packaging, etc.) to the at least one distribution format characteristic.

In step 510, a status of the first asset can be detected. In one aspect, the status can indicate if a copy of the first asset in a distribution format is currently being transmitted. Other steps, such as conforming the second asset to the same distribution formats as the first asset, can be performed before, after, or during the detection of the status. In step 512, an identifier such as a uniform resource identifier (URI) can be associated with the second asset in the distribution format instead of with the first asset. The URI (or another identifier or link) can be configured to locate the second asset. For example, the same URI that was formerly used to locate the first asset can be modified to locate the second asset instead of first asset. In one aspect, associating the URI can occur after the status indicates that the copy of the first asset in the distribution format is not currently being transmitted. Other location mechanisms are specifically contemplated beyond the use of a URI.

Figure 6:
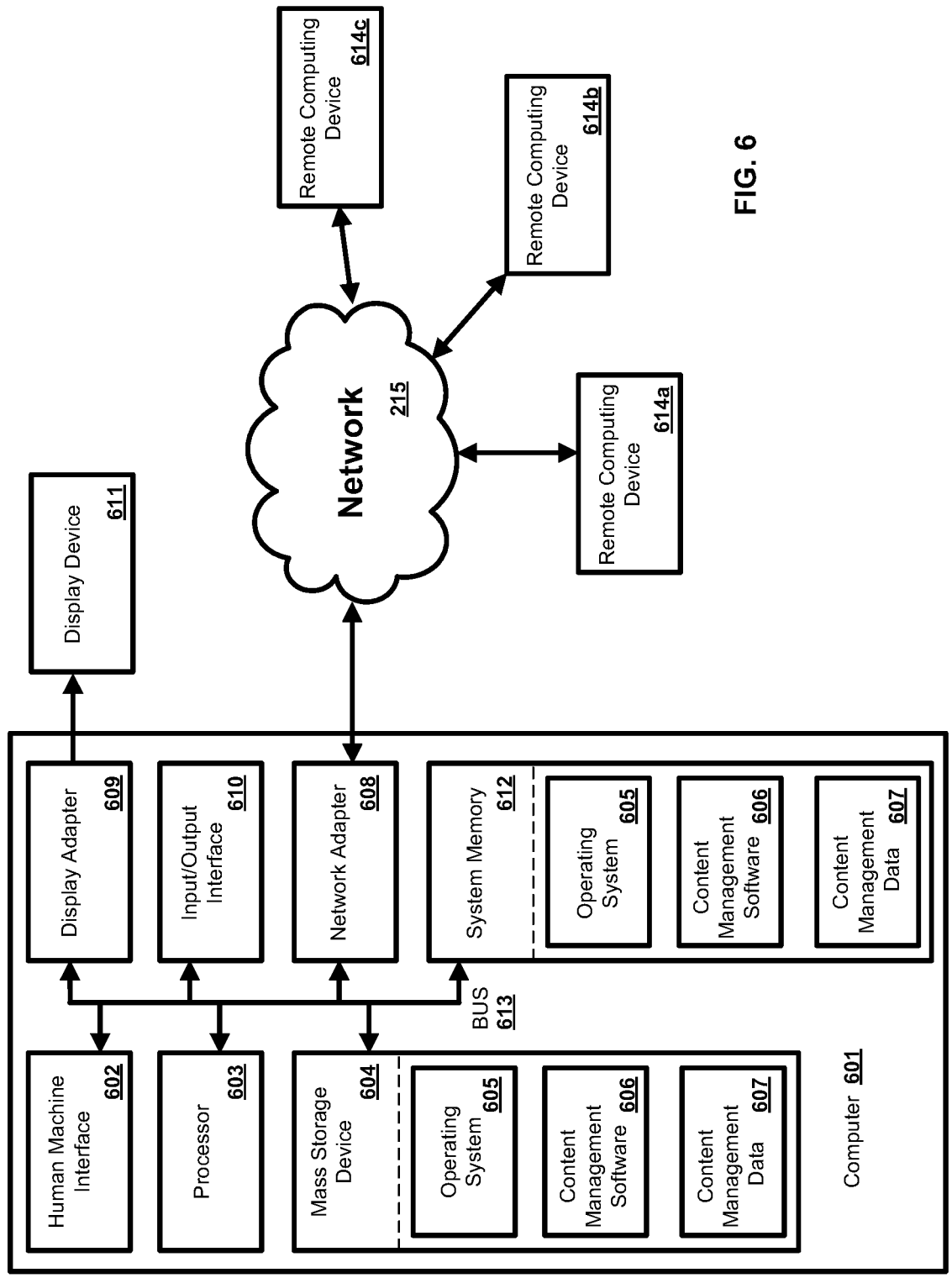
FIG. 6 is a block diagram illustrating an exemplary computer in which the present methods and systems can be implemented.

In an exemplary aspect, the methods and systems can be implemented on a computer 601 as illustrated in FIG. 6 and described below. By way of example, content management system 102 of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI- Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, content management software 606, content management data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as content management data 607 and/or program modules such as operating system 605 and content management software 606 that are immediately accessible to and/or are presently operated on by the processing unit 603.

In another aspect, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and content management software 606. Each of the operating system 605 and content management software 606 (or some combination thereof) can comprise elements of the programming and the content management software 606. Content management data 607 can also be stored on the mass storage device 604. Content management data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of content management software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving, by a content management system, an asset for distribution;
   conforming, based on a publishing profile of a plurality of publishing profiles, the asset with a distribution format of a destination asset distribution system, wherein the publishing profile is associated with the destination asset distribution system, wherein the destination asset distribution system is external to the content management system, and wherein the publishing profile indicates the distribution format and a submission standard;
   determining, based on the publishing profile, a metadata object comprising data associated with the asset, wherein the data is formatted according to the submission standard;
   receiving modification data associated with at least one of the asset or the data associated with the asset; and
   updating, based on the modification data, the metadata object.

2. The method of claim 1, further comprising releasing the metadata object to the destination asset distribution system.

3. The method of claim 1, wherein determining the metadata object comprises determining at least one of: an extended markup language (XML) file, a multipurpose internet mail extensions (MIME) multipart message, or a hypertext file comprising a plurality of markup nodes.

4. The method of claim 1, wherein determining the metadata object comprises executing an extended markup language (XML) determination process.

5. The method of claim 1, wherein determining the metadata object comprises specifying a release method for the asset that is specific to the destination asset distribution system, wherein the metadata object comprises the release method.

6. The method of claim 1, wherein determining the metadata object comprises specifying at least one file target for distribution of the asset that is specific to the destination asset distribution system, wherein the metadata object comprises the at least one file target.

7. The method of claim 1, wherein the asset comprises streaming content.

8. The method of claim 1, wherein the asset comprises at least one of a video segment or an audio segment.

9. The method of claim 1, further comprising releasing the updated metadata object to the destination asset distribution system.

10. An apparatus comprising:
    one or more processors; and
    memory storing processor-executable instructions that, when executed by the one or more processors, cause the apparatus to:
    receive, by a content management system, an asset for distribution;
    conform, based on a publishing profile of a plurality of publishing profiles, the asset with a distribution format of a destination asset distribution system, wherein the publishing profile is associated with the destination asset distribution system wherein the destination asset distribution system is external to the content management system, and wherein the publishing profile indicates the distribution format and a submission standard;
    determine, based on the publishing profile, a metadata object comprising data associated with the asset, wherein the data is formatted according to the submission standard;
    receive modification data associated with at least one of the asset or the data associated with the asset; and
    update, based on the modification data, the metadata object.

11. The apparatus of claim 10, wherein the processor-executable instructions, when executed by the one or more processors, further cause the apparatus to release the metadata object to the destination asset distribution system.

12. The apparatus of claim 10, wherein the processor-executable instructions that, when executed by the one or more processors, cause the apparatus to determine the metadata object further cause the apparatus to determine one or more at least one of: an extended markup language (XML) file, a multipurpose internet mail extensions (MIME) multipart message, or a hypertext file comprising a plurality of markup nodes.

13. The apparatus of claim 10, wherein the processor-executable instructions that, when executed by the one or more processors, cause the apparatus to determine the metadata object further cause the apparatus to execute an extended markup language (XML) determination process.

14. The apparatus of claim 10, wherein the processor-executable instructions that, when executed by the one or more processors, cause the apparatus to determine the metadata object further cause the apparatus to specify a release method for the asset that is specific to the destination asset distribution system, wherein the metadata object comprises the release method.

15. The apparatus of claim 10, wherein the processor-executable instructions that, when executed by the one or more processors, cause the apparatus to determine the metadata object further cause the apparatus to specify at least one file target for distribution of the asset that is specific to the destination asset distribution system, wherein the metadata object comprises the at least one file target.

16. The apparatus of claim 10, wherein the processor-executable instructions, when executed by the one or more processors, further cause the apparatus to release the updated metadata object to the destination asset distribution system.

17. The method of claim 1, wherein the modification data comprises an update to at least one of a title and a description of the asset.

18. The apparatus of claim 10, wherein the modification data comprises an update to at least one of a title and a description of the asset.

19. One or more non-transitory computer-readable media storing processor-executable instructions that, when executed by at least one processor, cause the at least one processor to:

receive, by a content management system, an asset for distribution;

conform, based on a publishing profile of a plurality of publishing profiles, the asset with a distribution format of a destination asset distribution system, wherein the publishing profile is associated with the destination asset distribution system, wherein the destination asset distribution system is external to the content management system, and wherein the publishing profile indicates the distribution format and a submission standard;

determine, based on the publishing profile, a metadata object comprising data associated with the asset, wherein the data is formatted according to the submission standard;

receive modification data associated with at least one of the asset or the data associated with the asset; and update, based on the modification data, the metadata object.

\* \* \* \* \*